United States Patent [19]

Angelo et al.

[11] Patent Number: 5,669,697

[45] Date of Patent: Sep. 23, 1997

[54] TRUCK SUN VISOR

[75] Inventors: Gerald J. Angelo, Redmond; Alex G. Bernasconi, Kent; Daniel P. Dunne, Seattle, all of Wash.

[73] Assignee: PACCAR Inc., Bellevue, Wash.

[21] Appl. No.: 641,471

[22] Filed: May 1, 1996

[51] Int. Cl.⁶ ...................................................... B60Q 1/02
[52] U.S. Cl. ................ 362/80; 362/80.1; 296/95.1
[58] Field of Search ......................... 362/74, 80, 80.2, 362/83.3, 64, 249, 220; 296/95.1, 97.1, 152; D12/191

[56] References Cited

U.S. PATENT DOCUMENTS

| | | |
|---|---|---|
| 4,726,619 | 2/1988 | Haugestad ............................. 296/95.1 |
| 4,966,404 | 10/1990 | Lund ..................................... 296/95.1 |
| 5,130,906 | 7/1992 | Lund ..................................... 296/95.1 |
| 5,452,933 | 9/1995 | Stanesic et al. ..................... 296/95.1 |
| 5,522,634 | 6/1996 | Stanesic et al. ..................... 296/95.1 |
| 5,544,929 | 8/1996 | Nagai ..................................... 362/74 |

Primary Examiner—Thomas M. Sember
Attorney, Agent, or Firm—Wells, St. John, Roberts, Gregory & Matkin, P.S.

[57] ABSTRACT

A sun visor for mounting upon a vehicle without drilling special holes or providing added mounting brackets. The visor includes a visor body configured for mounting adjacent the vehicle's front windshield. Light apertures are preferably included in the visor body. At least one mounting extension extends rearwardly from the visor body to form a mount. The mounting extension also forms a portion of an enclosure. Light is conveyed to the light apertures such as through the enclosures. A mounting connection is used to provide a mechanical connection between the mounting extension and a clearance light fixture or feature formed on the vehicle cab.

41 Claims, 4 Drawing Sheets

TRUCK SUN VISOR

TECHNICAL FIELD

This invention relates generally to sun visors for mounting upon a vehicle, and more particularly it concerns a sun visor and method for mounting the same upon a vehicle utilizing a novel mounting extension which capitalizes on structural features already existing on the vehicle for supporting the sun visor.

BACKGROUND OF THE INVENTION

Sun visors for mounting on the exterior of vehicles, such as trucks, are well-known. Such sun visors are typically mounted adjacent the vehicle's front windshield and provide a shaded area upon the windshield and added shade for an occupant or occupants of the vehicle.

Sun visors in the past have typically been attached to a vehicle by providing an additional physical connection or connections to the vehicle in the form of some type of drilled, or otherwise affixed external structure upon the vehicle cabin for supporting the sun visor. Provision of this type of mounting arrangement is undesirable for a number of reasons, not the least of which is the physical degradation of the body of the vehicle when such drilling connections are made. A depreciation in the appearance is also caused by such drilling or other external structure is affixed. Removal of the visor typically does not leave the original vehicle appearance intact. In addition, mounting such prior sun visors has proven difficult due to the extent to which the vehicle body must be prepared for receiving and holding the sun visor.

Additionally, individuals often will purchase a vehicle, and then at a later date decide to add a sun visor. In addition to the cost associated with the purchase of this additional accessory, such individual must often pay a dealer or another person specializing in post-purchase accessory application to actually mount the sun visor. This is typically done because the average vehicle owner normally does not have the required time, tools or expertise to undertake such a task. In mounting such an accessory, the dealer or accessory specialist must often drill or otherwise provide physical mounting structure on the vehicle. Again, from the standpoint of vehicle body degradation, this is an undesirable condition.

The ability of a manufacturer or owner to easily mount a sun visor on a vehicle would significantly add to the vehicle's value and flexibility in a couple of different ways. First, from the manufacturing standpoint, less assembly-line time spent actually mounting the sun visor on the vehicle results in cost savings. Second, from the ownership standpoint, the ability to quickly and easily mount or retrofit a purchased vehicle with a sun visor greatly enhances the owner's perceived and actual value of the vehicle. There may also be instances, such as repair or change of ownership, where it is desirable to be able to conveniently remove a sun visor.

This invention grew out of the need to provide a durable rugged sun visor which may be easily mounted or de-mounted upon or from a vehicle. This is preferably done either as part of the factory-installed equipment, or as a post-purchase retrofit. It is further desirable to accomplish such without drilling the cab or adding special mounting fixtures thereto.

BRIEF DESCRIPTION OF THE DRAWINGS

Preferred embodiments of the invention are described below with reference to the accompanying drawings, which are briefly described below.

FIG. 4 shows one of a plurality of mounting extensions.

DETAILED DESCRIPTION OF THE PREFERRED EMBODIMENTS

Figure 1:
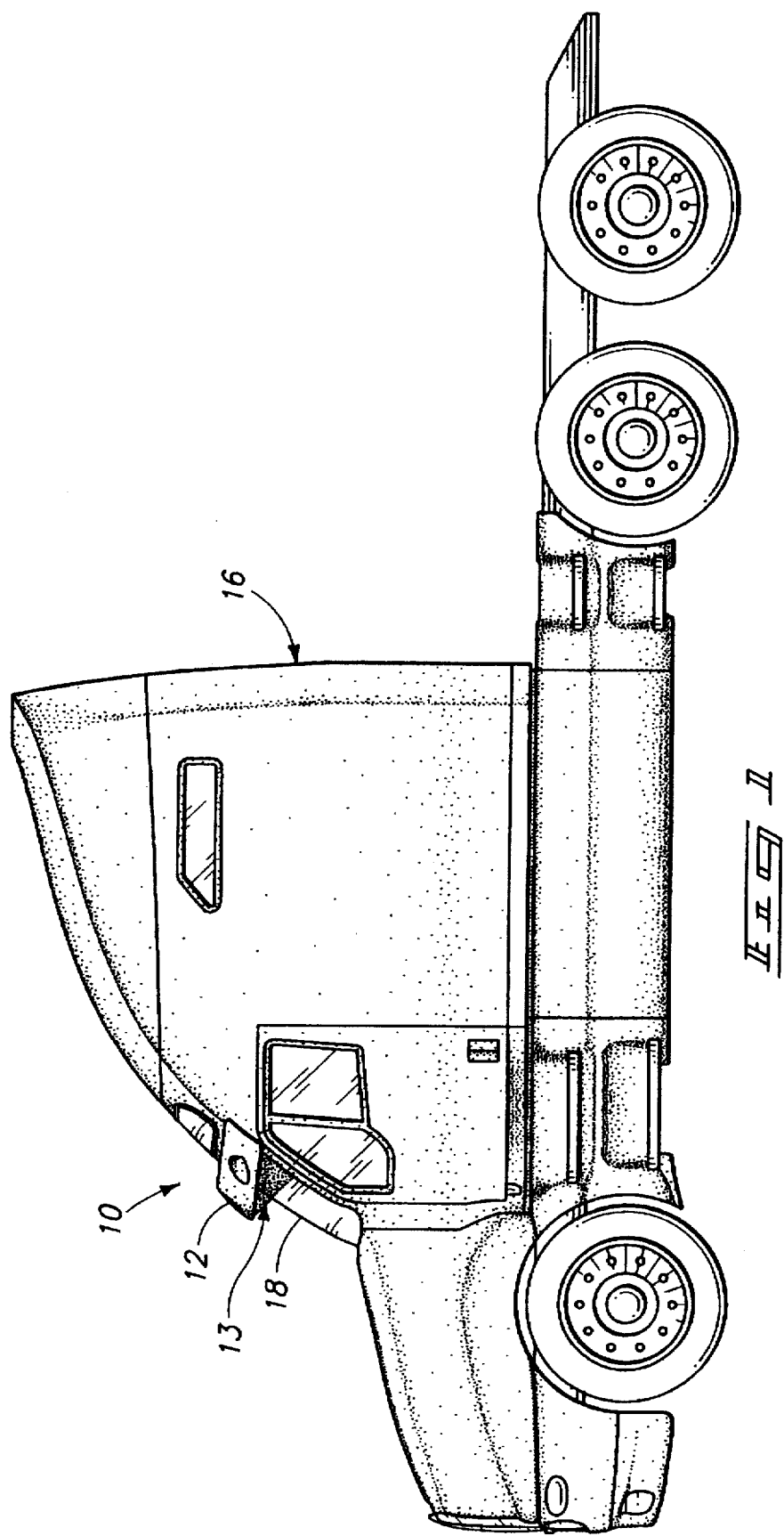
FIG. 1 is a side elevational view of a vehicle upon which a sun visor is mounted according to a preferred embodiment of the present invention.

This disclosure of the invention is submitted in furtherance of the objectives of patent laws to promote the progress of science, technology and the useful arts.

TABLE 1

Listing of Subsections of Detailed Description and Pertinent Items with Reference Numerals Visor Body
   sun visor 10
   visor body 12
   mounting extensions 14
   vehicle 16
   windshield 18
   shaded area 13
   light aperture 20
   light aperture lens 21
   seals or grommets 23
Mounting Extensions
   annular flange or shoulder 15
   end part or cap 17
   conduit part 19
   electrical wire or wires 25
   wire harness 22
Mounting Connections
   clearance light fixture 24
   receptacle wall 26
   back piece 28
   annular flange portion 32
   annular seal 30
   mounting connection 34
   bolt 36
   engagement piece or washer 38
   nut 40
   light source 43
   holder or case 45
   light bulb or other source 47
Operation and Method

Visor Body

Figure 2:
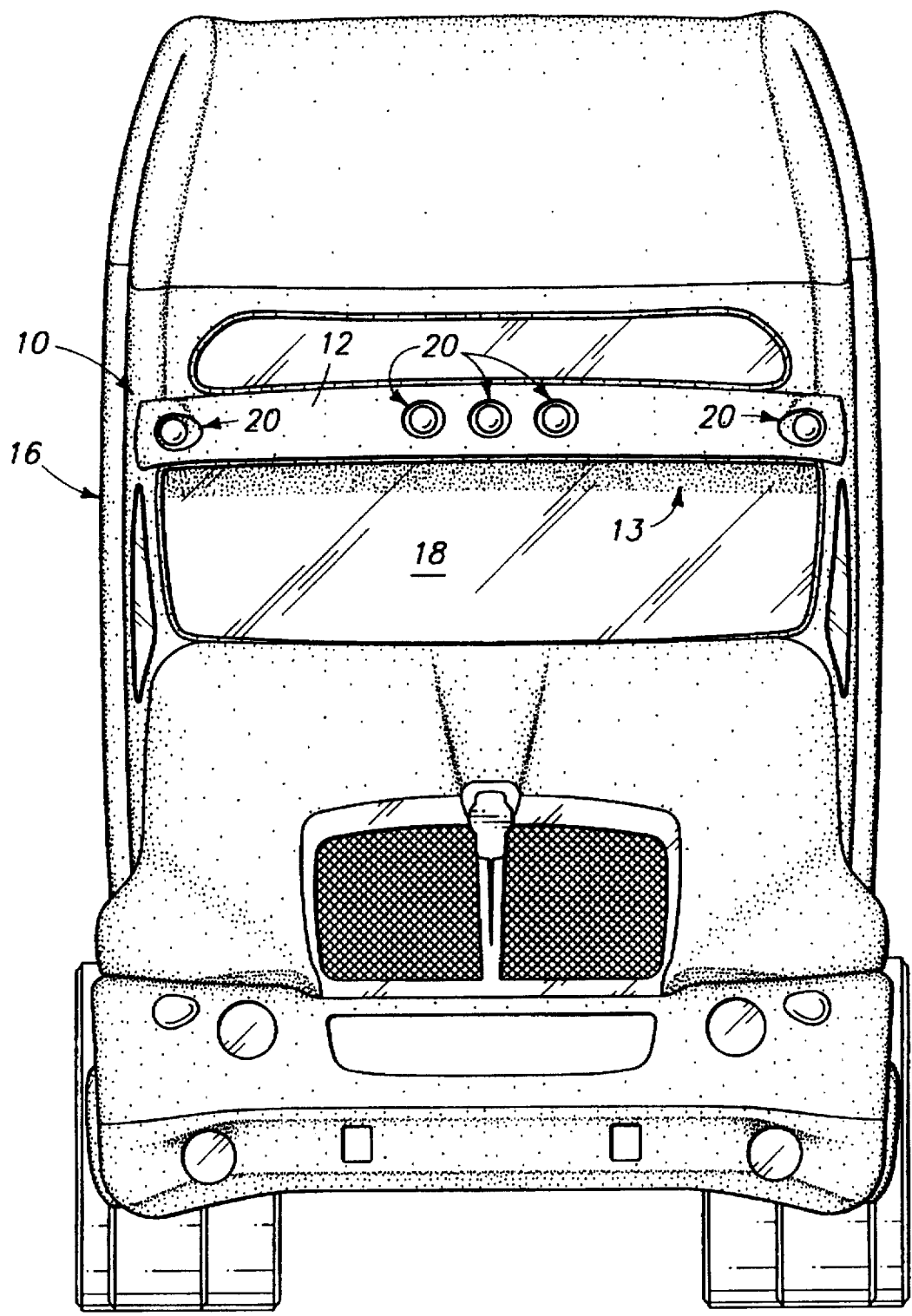
FIG. 2 is a front elevational view of the vehicle of FIG. 1 upon which the preferred sun visor is mounted.

FIGS. 1 and 2 show a sun visor 10 according to a preferred embodiment of this invention. Sun visor 10 includes a visor body 12 and a plurality of mounting extensions 14. Portions of the mounting extensions are shown detailed in FIG. 4 and described below.

The visor body is for installation upon a vehicle 16. In the preferred embodiment, vehicle 16 is a truck cab which is suitable for use in a truck and tractor trailer configuration. As positioned, visor body 12 is proximate or adjacent the vehicle's front windshield 18 and casts a shadow or shaded area 13 upon the windshield for an occupant of the vehicle.

Shaded area 13 provides an occupant of the vehicle with shade and protects against the sun's glare.

Before describing in detail the preferred embodiment or embodiments, it should be understood that sun visor 10 may be factory-installed on vehicle 16, or may be retrofitted by any owner after purchase of the vehicle using structure which is already in place on the vehicle, as part of the structural support for supporting visor body 12 thereon. This makes mounting the visor on a vehicle much more easier than previous known visors as will become apparent below.

FIG. 2 shows that visor body 12 extends completely across windshield 18 in a manner which provides shade for both a driver and an occupant of the vehicle. It is possible, however, for the visor body to extend across less than the complete length of the windshield. Visor body 12 is preferably an elongate, rigid band-like structure which includes a somewhat flat central portion which extends across the front of the vehicle. The visor body has end portions which are joined to the central portion and which curve or bow to wrap into the corners of the vehicle rear to front corner posts. Preferably, visor body 12 is formed from a material possessing sufficient strength characteristics which enable it to withstand the stresses to which it will be subjected in the operating environment. More specifically, during highway travel, stresses are generated from commonly encountered weather phenomena and manmade conditions. Weather phenomena such as sun, wind, rain, snow, hail, and the like; and, manmade conditions such as flying rocks or pebbles such as the kind kicked up by other vehicles, place structural demands on the materials utilized to form visor body 12. As such, materials like sheet molding compounds, rigid thermoplastics, or fiberglass composites are likely candidates for forming visor body 12. Other materials will be apparent to those of skill in the art.

Figure 3:
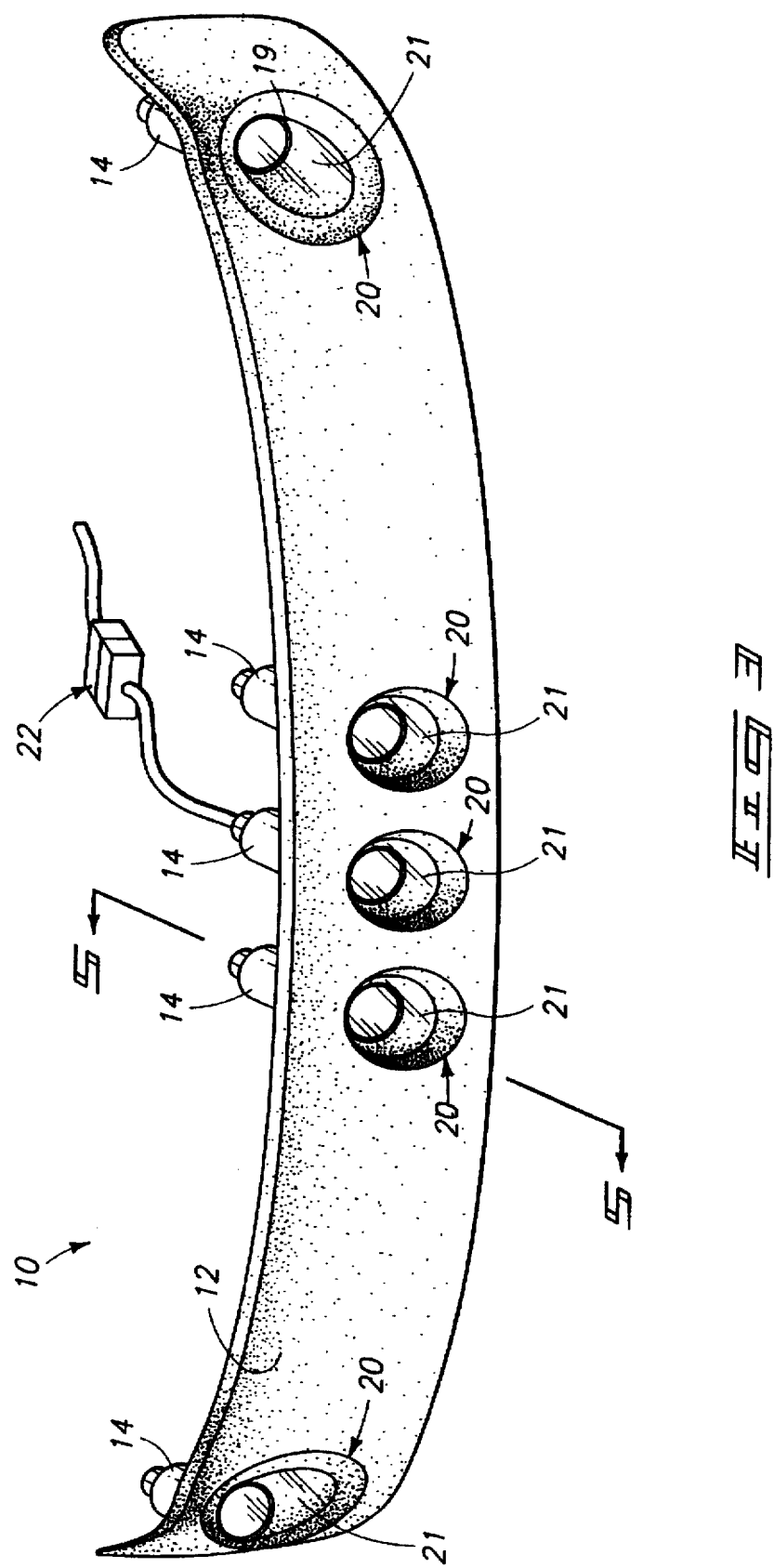
FIG. 3 is a perspective view of the sun visor of FIG. 1.

Referring to FIGS. 2 and 3, at least one light aperture 20, and preferably five such apertures are provided in visor body 12. Such apertures are most easily seen in FIG. 3. Each of light apertures 20 defines a portion of a so-called clearance light. Clearance lights are advantageously spaced across visor body 12 so that three apertures appear in or near the center of the visor body, and two apertures appear at either end of the visor body. Clearance lights are useful for a number of reasons which include providing a driver of the vehicle with an extra degree of visibility, and providing drivers in other approaching vehicles with a visual indication that vehicle 16 is approaching. The terms "light aperture" as used herein shall be understood to mean that structure on visor body 12 from or through which light may originate or pass.

Figure 5:
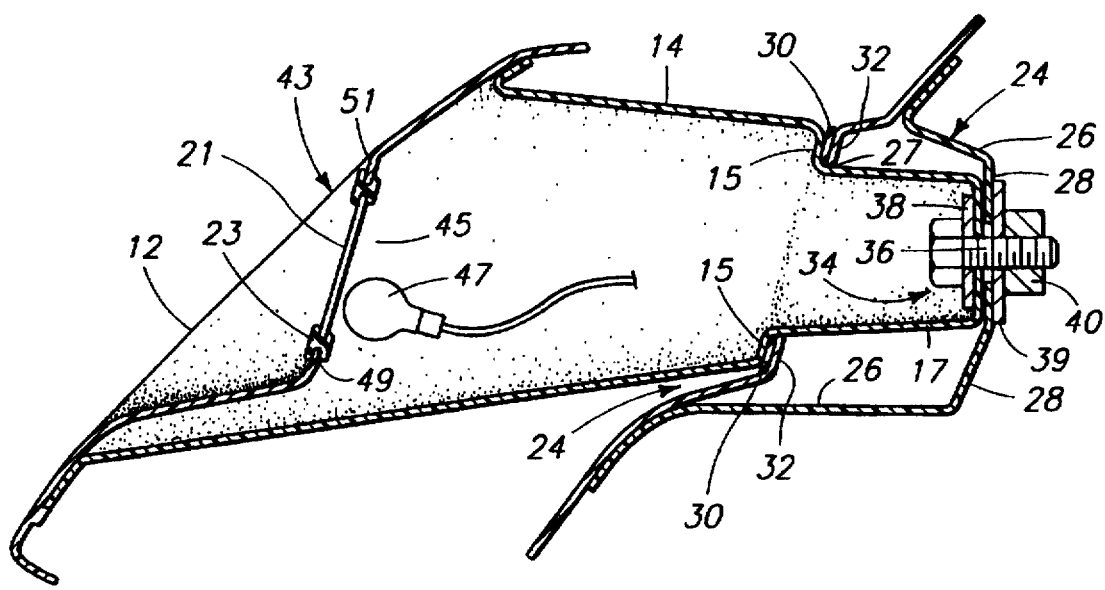
FIG. 5 is a sectional view taken along line 5—5 of FIG. 3.

Each of light apertures 20 may include a light aperture lens 21 secured in place by suitable seals or grommets 23 (FIG. 5). The terms "light aperture lens" are intended to mean a lens or any part of a translucent structure associated with a respective one of the light apertures and through which light is permitted to pass. The lens covers at least a portion of the light aperture with which it is associated and protects an internal source of light 47 (FIG. 5) from the elements. The apertures allow light from the source of light to be beamed therethrough for providing a visual indication that the vehicle upon which the visor body is mounted is approaching. Each light aperture lens 21 protects a respective one of the light sources.

Mounting Extensions

Figure 4:
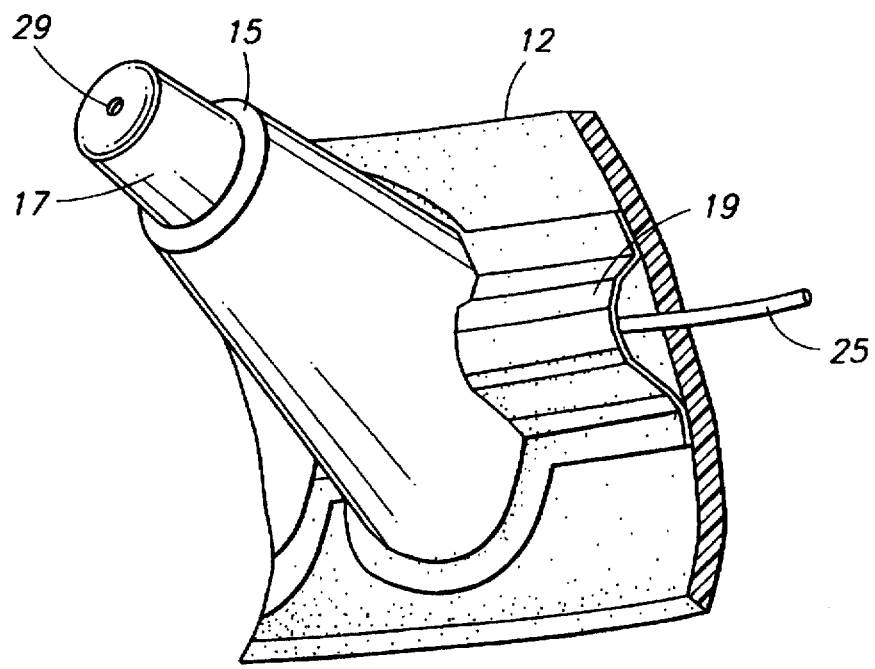
FIG. 4 is a perspective view from the rear of the sun visor of FIG. 1.

FIGS. 3 and 4 show mounting extensions 14 in more detail. FIG. 4 is a perspective view which looks from the back side upon a single one of the mounting extensions. It will be understood that each of the mounting extensions is configured similar to that described with reference to FIG. 4. FIG. 3 shows a plurality of mounting extensions 14, and preferably five such mounting extensions which are attached or connected to visor body 12. Any suitable number of mounting extensions could be conveniently located or attached to visor body 12. Each of the mounting extensions 14 projects rearwardly from visor body 12 and forms an operative connection between the visor body and the vehicle described in more detail below. Each mounting extension is a tubular extension which is somewhat frusto-conical in shape, such shape defining at least a portion of an enclosure within or from which light from a light source may be conveyed or beamed. The tubular extensions support the visor body 12 in a spaced relationship relative to the vehicle's cab and windshield in a manner enabling the visor body to cast a shadow as mentioned above.

FIG. 4 shows a respective one of mounting extensions 14. Mounting extension 14 includes an annular flange or shoulder 15 and an end part or cap 17. Each end part 17 is adjacent shoulder 15 and projects rearwardly therefrom. Each end part includes an aperture 29 for two purposes which will be described below.

In the preferred embodiment, a plurality of light sources 47 are provided and each light source is mounted at or interiorly within a respective one of the enclosures defined by the mounting extensions. Such light sources define a plurality or bank of clearance lights which are mounted upon the visor body.

FIG. 4 also shows a conduit part 19 which is operatively connected with each of the mounting extensions for providing an enclosed wiring passage along which an electrical wire or wires 25 may pass for electrically interconnecting each of the respective light sources. Conduit parts 19 also serve as structural beams forming a part of the visor body to add rigidity.

FIG. 3 shows a wire harness 22 which, according to a preferred aspect of the invention, forms part of the operative connection between visor body 12 and the vehicle. Wire harness 22 provides an electrical connection between the vehicle and visor body 12 and serves to provide electrical power from the vehicle to the light sources which are provided at the apertures 20. Electrical power is conveyed to the light sources from harness 22 by the aforementioned wire or wires which extend through conduit 19. It will be appreciated that any suitable source of power can be used to provide the required electrical power to light the light sources 47. In the most preferred form, wire harness 22 is operatively connected through the centermost mounting extension, although the operative connection could be alternatively formed with through any of the mounting extensions.

Mounting Connections

Mechanical connection between visor body 12 and vehicle 16 is achieved in part through the use of at least one mounting connection which is described directly below. Preferably the mounting connection or mounting connections are configured to provide a mechanical connection between at least one of the mounting extensions 14 described above and at least a portion of a clearance light fixture 24 (FIG. 5) as is described in detail below. Clearance light fixture 24 comprises part of the truck cab or other vehicle structure.

FIG. 5 is a side sectional view of one of the mounting extensions 14 and the structure on vehicle 16 with which mechanical interconnection is made. For purposes of ongoing discussion, it will be understood that the depicted mounting extension is not the centermost mounting extension of visor body 12 with which wire harness 22 is operatively associated.

A clearance light fixture or feature 24 is provided and forms an integral part of the truck cab. As shown, clearance light fixture 24 includes a receptacle into which a light source may be inserted for providing clearance light operations when visor 10 does not form part of the truck cab's structure. Normally, when sun visor 10 does not form part of the truck's cab structure, a conventional clearance light is housed or connected somewhere within or proximate to clearance light fixture 24. However, when sun visor 10 is to be added, either as part of the factory-provided original equipment or as a retrofit, clearance light fixture 24 and others like it take on a new, added role which includes mechanically supporting visor body 12, and providing conduits through which electrical wiring can pass.

More specifically, a portion of clearance light fixture 24 includes a receptacle wall 26 with a back piece 28 connected or joined thereto. Back piece 28 includes an aperture which may be used to pass a wire or wires for providing electrical power to originally-mounted clearance lights. Mounting extension 14 is insertable into fixture 24 through an aperture 27. When so inserted an annular flange portion 32 serves to engage annular shoulder 15 of mounting extension 14 restricting further insertion thereinto. An intermediate annular seal 30 includes an amount of closed cell foam which ensures that the region internally of clearance light fixture 24 is protected against water entry and other debris. The seal also adds a degree of structural coupling. A preferred mounting connection 34 includes the structures explained above which are in the preferred form secured using a bolt 36, a first engagement piece or washer 38, second engagement piece or washer 39, and a nut 40 screw threadedly fastened to an end of bolt 36 for bearing against back piece 28.

Mounting connection 34 is configured to provide a mechanical connection between mounting extension 14 and at least a portion of clearance light fixture 24. More specifically, engagement piece 38 includes a central aperture 29 (FIG. 4) through which bolt 36 may be inserted. After so inserted, bolt 36 passes through an aperture in end cap 17, and then an aperture in back piece 28. Nut 40 engages bolt 36 and draws the bolt and engagement piece 38 into abutting confrontation with an interior end surface of end cap 17. This serves to firmly engage annular flange 15 against shoulder portion 32 (and seal 30). Each of the mounting extensions, except for the centermost extension, is connected in an identical or similar manner. It will be understood that other mounting connections may be utilized and that the above-described mounting connection is only a preferred connection and is not intended to limit the invention to the specific version shown.

As shown, the light source 43 is preferably provided as an integrated assembly with lens 21. The assembly includes a holder or case 45 within which a suitable light bulb or other source 47 is mounted. Seal or grommet 23 allows the assembly to be detachably mounted in the aperture at rim 49. Rim 49 is an annular flange into which light source 43, and more particularly holder 45 is snapped for a fitting engagement using grommet 23.

Although a particular mounting connection has been described above, it is to be understood that other mounting connections may be used and incorporated herein according to the present invention. For example, selectively releasable, spring-loaded locking mechanisms may be utilized to reduce the number of discrete parts, i.e. bolt 36, engagement piece 38, and nut 40. An actuation button may be conveniently located adjacent one or each mounting extension for enabling an individual to selectively release the locking mechanism for applying/removing sun visor 10 to (from) a vehicle. There are numerous manners of providing a mechanical connection between the mounting extensions and an associated clearance light fixture, and many of such manners may be suitable for use in this invention.

Operation and Method

In operation, the present invention provides a vehicle-mounted sun visor and method for mounting the same. The sun visor is versatile, rugged and extremely convenient for an owner of a vehicle to mount, use and enjoy. The method of mounting the sun visor of the present invention provides a quick and convenient means by which an individual, whether at a factory or manufacturing facility installing the sun visor as part of the vehicle's original equipment, or as an owner retrofitting the sun visor on a currently owned vehicle.

In order to mount the preferred sun visor upon a vehicle, the vehicle should be provided with a number of suitable and appropriately located clearance light fixtures, or similar features. Exemplary features are like the ones shown in sectional view at 24 in FIG. 5. Such clearance light features normally hold, surround or contain a light source or light bulb for providing illumination. Additionally, such clearance light fixtures normally include a lens which protects the light source held internally of the clearance light fixture.

If such a lens is provided on the clearance light fixture 24, it will typically first be removed. After removing or possibly adjusting the lens, the original light source (located internally of the clearance light fixture) may have to be removed. Alternatively, the same light source which is part of a truck cab's original lighting structure might be used as a light source on the sun visor. After removing the original light source in each of the clearance light fixtures, sun visor 10 is ready for mounting on the vehicle.

One aspect of the invention which is most convenient is the fact that sun visor 10 may be mounted on a vehicle using structure which is already in place on the vehicle, and without irreversible changes being made. That is, it is not necessary to provide any additional mounting features externally on the vehicle's body, e.g. drilled holes, mounting brackets and the like, for the purpose of mounting the sun visor. From this standpoint, the integrity of the vehicle's body is preserved.

In order to mount a sun visor according to the present invention, one must first insert each one of the mounting extensions 14 into an associated clearance light fixture 24. The mounting extensions are preferably dimensioned so that at least a portion thereof forms a snug fit with at least a part of the clearance light fixture. The mounting extensions are conveniently located so that each one lines up with a respective clearance light fixture along a central or longitudinal axis. Thus, it is contemplated that the insertion of each of the mounting extensions into a respective one of the clearance light fixtures would take place substantially simultaneously and along such central or longitudinal axis. Each mounting extension 14 should be inserted far enough into a respective clearance light fixture so that an annular shoulder 15 (FIG. 5) on the mounting extension comes into abutting contact with an annular flange portion 32 which forms part of the cab fixture or feature. This assists in forming the snug fit mentioned above. Seal 30 ensures that when mounting extension 14 is so inserted, the area internally of receptacle wall 26 is protected against the entry of water and other debris.

Additionally, it will be appreciated that the frusto-conical shape of the main body of mounting extension 14 may serve, in some particular clearance light fixture constructions, to exert a radially outwardly directed pressure upon the clearance light fixture, which, together with the mounting connection described above and below, may serve to more firmly mount the mounting extension on or within the clearance light fixture. In such instances, the receptacle into which mounting extension 14 is inserted could have a complementary shape.

Once the mounting extensions are inserted as described above, the methods preferably include applying a fastener or otherwise forcing or restraining the sun visor 10 in the direction of vehicle 16 to ensure that the visor remains securely held against the vehicle. More specifically, mounting connection 34 in FIG. 5 includes a bolt 36 and an engagement piece 38. The engagement piece may take the form of a standard washer which is suitably dimensioned to engage the interior surface of end cap 17. First, bolt 36 is inserted into the interior of mounting extension 14 so that it extends through: a) an aperture in end cap 17; and b) an aperture in back piece 28. Thereafter, a washer 39 and nut 40 are applied to the bolt end. Subsequent screw threaded advancement serves to draw the bolt, and hence engagement piece 38 into abutting confrontation with the interior surface of end cap 17.

Thereafter, light source 43 may be snapped or slid into place as the case may be. A suitable light aperture lens 21 such as that shown in FIG. 3 may be separately provided and fixed on or within each of light apertures 20 in visor body 12. It will be understood that each of the light aperture lenses may be separately provided and affixed on or within a respective one of the apertures, or that the light aperture lens may form an integral part of a light source (such as light source 43 in FIG. 5) by being provided on holder 45. The above operation is repeated for each of the mounting extensions as may be provided.

With sun visor 10 conveniently added to vehicle 16, the vehicle is configured for operation, and the occupant or occupants thereof are provided with a shaded area upon the windshield which greatly reduces the sun's blinding glare and heat buildup within the vehicle cabin.

The invention has been described in language more or less specific as to structural, methodological, or other aspects and features. It is to be more properly understood that the invention is not necessarily limited to the specific forms shown and described. Other equivalent structures and features may also be within the inventive concepts which are appropriately protected under the grant of patent rights being sought. The invention is therefore being claimed in an effort to define the invention but the various forms or modifications which the invention may take is difficult or impossible to define with certainty. Judgement must be utilized to properly interpret the scope of protection which is to be appropriately applied with regard to these new and inventive concepts.

We claim:

1. A sun visor for mounting upon a vehicle comprising:
   a visor body configured for mounting on a vehicle adjacent the vehicle's front windshield; said visor body casting a shaded area upon the windshield;
   at least one light aperture in the visor body;
   at least one mounting extension attached to said visor body and projecting rearwardly therefrom, said at least one mounting extension being configured for attachment to a corresponding clearance light fixture on the vehicle and thereby forming an operative connection between said visor body and the vehicle; said at least one mounting extension forming at least a portion of an enclosure from which light is conveyed to said at least one light aperture.

2. The sun visor of claim 1 further comprising at least one light source for beaming light through said at least one light aperture.

3. The sun visor of claim 1 wherein said at least one mounting extension includes a plurality of mounting extensions.

4. The sun visor of claim 1 wherein said at least one mounting extension includes a plurality of mounting extensions; and further comprising at least one light source for beaming light through said at least one light aperture.

5. The sun visor of claim 1 wherein said at least one mounting extension includes a plurality of mounting extensions; and further comprising a plurality of light sources; at least most of said plurality of said mounting extensions being operatively associated with a respective one of said plurality of light sources.

6. The sun visor of claim 1 wherein said at least one mounting extension includes a plurality of mounting extensions; and further comprising at least one light source for beaming light through said at least one light aperture; wherein at least one of said operative connections between said visor body and the vehicle is an electrical connection serving to provide electrical power to said at least one light source.

7. The sun visor of claim 1 wherein said at least one mounting extension includes a plurality of mounting extensions; and further comprising a plurality of light sources; at least most of said plurality of said mounting extensions being operatively associated with a respective one of said plurality of light sources; wherein at least one of said operative connections between said visor body and the vehicle is an electrical connection serving to provide electrical power to said plurality of light sources.

8. A sun visor for mounting upon a vehicle adjacent a front windshield thereof, comprising:
   a visor body configured for casting a shaded area upon the windshield;
   at least one mounting extension connected to said visor body and extending therefrom;
   at least one mounting connection configured to provide a mechanical connection between the at least one mounting extension and a clearance light fixture on the vehicle;
   whereby the sun visor can be conveniently added to the vehicle at the clearance light fixture.

9. The sun visor of claim 8 further comprising at least one light aperture in the visor body.

10. The sun visor of claim 8 wherein said at least one mounting extension includes a plurality of mounting extensions.

11. The sun visor of claim 8 wherein said at least one mounting extension includes a plurality of mounting extensions, and further comprising a plurality of light apertures in the visor body.

12. The sun visor of claim 8 further comprising:
   at least one light aperture in the visor body;
   at least one clearance light on the sun visor for beaming light through the at least one light aperture.

13. The sun visor of claim 8 further comprising:
   at least one light aperture in the visor body;
   at least one light aperture lens for covering the light aperture while allowing light to be beamed therethrough;
   at least one clearance light on the sun visor for beaming light through the at least one light aperture.

14. The sun visor of claim 8 wherein said at least one mounting extension includes a plurality of mounting extensions, at least some of said plurality of mounting extensions being dimensioned for holding a light source; and further comprising an electrical connection between the vehicle and at least most of said plurality of mounting extensions; said electrical connection serving to provide electrical power to a light source which may be held by said at least most of said plurality of mounting extensions.

15. The sun visor of claim 8 wherein said at least one mounting extension includes a plurality of mounting extensions, at least most of said plurality of mounting extensions being dimensioned for holding a light source; and further comprising a plurality of light sources each of which is held by one of said mounting extensions.

16. A vehicle and visor assembly comprising:
   a vehicle; said vehicle including a front windshield and at least one clearance light fixture receptacle adjacent said windshield;
   a visor body; said visor body serving to cast a shaded area for an occupant of said vehicle; and
   at least one respective mounting extension on said visor body for insertion into said at least one clearance light fixture receptacle to interconnect said visor body with at least a portion of said at least one clearance light fixture receptacle.

17. The assembly of claim 16, wherein said at least one clearance light fixture receptacle includes a plurality of clearance light fixture receptacles, and said at least one mounting extension includes a plurality of mounting extensions; each of said plurality of mounting extensions being associated with a respective one of said plurality of clearance light fixture receptacles.

18. The assembly of claim 16 further comprising at least one mounting connection configured to provide a mechanical connection between the at least one mounting extension and a clearance light fixture on the vehicle;
   whereby the sun visor can be conveniently added to the vehicle at the clearance light fixture.

19. The assembly of claim 16, wherein said at least one clearance light fixture receptacle includes a plurality of clearance light fixture receptacles, and said at least one mounting extension includes a plurality of mounting extensions; each of said plurality of mounting extensions being associated with a respective one of said plurality clearance light fixture receptacles; and comprising at least one mounting connection configured to provide a mechanical connection between at least one of the plurality of mounting extensions and clearance light fixtures on the vehicle;
   whereby the sun visor can be conveniently added to the vehicle at the clearance light fixture.

20. The assembly of claim 16, wherein said at least one mounting extension includes a plurality of mounting extensions at least most of which being dimensioned for holding a light source.

21. The assembly of claim 16, wherein said at least one mounting extension includes a plurality of mounting extensions at least most of which being dimensioned for holding a light source; and further comprising a plurality of light sources held by said at least most of said mounting extensions.

22. The assembly of claim 16, wherein said at least one mounting extension includes a plurality of mounting extensions at least most of which being dimensioned for holding a light source; and further comprising at least one mounting connection configured to provide a mechanical connection between at least one of the mounting extensions and a clearance light fixture on the vehicle;
   whereby the sun visor can be conveniently added to the vehicle at the clearance light fixture.

23. The assembly of claim 16, wherein said at least one mounting extension includes a plurality of mounting extensions at least most of which being dimensioned for holding a light source; and further comprising:
   a plurality of light sources each of which being held by a respective one of said at least most of said mounting extensions; and
   at least one mounting connection configured to provide a mechanical connection between at least one of the plurality of mounting extensions and a clearance light fixture on the vehicle;
   whereby the sun visor can be conveniently added to the vehicle at the clearance light fixture.

24. The assembly of claim 16 further comprising at least one mounting connection configured to provide a mechanical connection between the at least one mounting extension and a clearance light fixture on the vehicle; said at least one mounting connection comprising a bolt, a portion of which engaging said at least one mounting extension and a portion of said clearance light fixture;
   whereby the sun visor can be conveniently added to the vehicle at the clearance light fixture.

25. The assembly of claim 16, wherein said at least one mounting extension includes a plurality of mounting extensions at least most of which being dimensioned for holding a light source; and further comprising:
   a plurality of light sources held by a respective one of said at least most of said mounting extensions; and
   at least one mounting connection configured to provide a mechanical connection between at least one of the plurality of mounting extensions and a clearance light fixture on the vehicle; said at least one mounting connection comprising a bolt, a portion of which engaging at least one of the plurality of mounting extensions and a portion of said clearance light fixture;
   whereby the sun visor can be conveniently added to the vehicle at the clearance light fixture.

26. A method for mounting a sun visor upon a vehicle adjacent a front windshield thereof, comprising the steps of:
   finding at least one clearance light fixture receptacle on the vehicle adjacent the windshield;
   providing a sun visor having a visor body;
   mounting the visor body upon the vehicle by inserting at least a portion of the sun visor into at least a portion of the clearance light fixture receptacle and using the at least one clearance light fixture receptacle for at least some structural support to hold the sun visor upon the vehicle;
   whereby the sun visor is mounted adjacent the front windshield.

27. The method of claim 26 further comprising providing at least one mounting extension connected to said visor body and extending away therefrom; said at least one mounting extension comprising at least part of the structural support used to hold the visor body upon the vehicle.

28. The method of claim 26 further comprising the steps of providing at least one light aperture in the visor body; and providing at least one clearance light on the sun visor for beaming light through the at least one light aperture.

29. The method of claim 26 further comprising the steps of:

providing at least one light aperture in the visor body;

providing at least one clearance light on the sun visor for beaming light through the at least one light aperture; and providing at least one light aperture lens for covering the at least one light aperture while allowing light to be beamed therethrough.

30. The method of claim 26, wherein said mounting step comprises:

providing at least one mounting connection configured to provide a mechanical connection between the visor body and the at least one clearance light fixture; and connecting the at least one mounting connection between said visor body and the at least one clearance light fixture.

31. The method of claim 26 further comprising:

providing at least one mounting extension connected to said visor body and extending away therefrom; said at least one mounting extension comprising at least part of the structural support used to hold the visor body upon the vehicle;

providing at least one mounting connection configured to provide a mechanical connection between the at least one mounting extension and the at least one clearance light fixture; and connecting the at least one mounting connection between the at least one mounting extension and the at least one clearance light fixture.

32. The method of claim 26 further comprising:

providing at least one mounting extension connected to said visor body and extending away therefrom; said at least one mounting extension comprising at least part of the structural support used to hold the visor body upon the vehicle;

providing at least one mounting connection configured to provide a mechanical connection between the at least one mounting extension and the at least one clearance light fixture; and connecting the at least one mounting connection between the at least one mounting extension and the at least one clearance light fixture;

wherein the at least one mounting connection comprises a bolt, a portion of which extends through the at least one mounting extension for engaging a portion of the at least one clearance light fixture.

33. A sun visor for mounting upon a vehicle adjacent a front windshield thereof, comprising:

a visor body configured for casting a shaded area upon the windshield;

at least one mounting extension connected to said visor body and extending therefrom;

at least one mounting connection configured to provide a connection between the at least one mounting extension and at least one clearance light fixture on the vehicle;

whereby the sun visor can be conveniently added to the vehicle at the at least one clearance light fixture.

34. The sun visor of claim 33, wherein said at least one clearance light fixture comprises at least one receptacle and said at least one mounting extension is configured for insertion into said at least one receptacle.

35. The sun visor of claim 33, wherein:

said at least one clearance light fixture comprises at least one receptacle and said at least one mounting extension is configured for insertion into said at least one receptacle; and at least a portion of said at least one mounting connection is disposed inside said at least one receptacle.

36. A vehicle and visor assembly comprising:

a vehicle; said vehicle including a from windshield and at least one clearance light fixture adjacent said windshield;

a visor body; said visor body serving to cast a shaded area for an occupant of said vehicle;

at least one mounting extension for interconnecting said visor body with at least a portion of said at least one clearance light fixture; and at least one mounting connection configured to provide a mechanical connection between the at least one mounting extension and a clearance light fixture on the vehicle;

whereby the sun visor can be conveniently added to the vehicle at the clearance light fixture.

37. The assembly of claim 36, wherein said at least one clearance light fixture includes a plurality of clearance light fixtures and said at least one mounting extension includes a plurality of mounting extensions; each of said plurality of mounting extensions being associated with a respective one of said clearance light fixtures.

38. The assembly of claim 36, wherein said at least one mounting extension includes a plurality of mounting extensions at least most of which being dimensioned for holding a light source.

39. The assembly of claim 36, wherein said at least one mounting extension includes a plurality of mounting extensions at least most of which being dimensioned for holding a light source; and further comprising a plurality of light sources held by said at least most of said mounting extensions.

40. The assembly of claim 36, wherein said at least one mounting connection comprises a bolt, a portion of which engages said at least one mounting extension and a portion of said clearance light fixture.

41. The assembly of claim 36, wherein said at least one mounting extension includes a plurality of mounting extensions at least most of which being dimensioned for holding a light source; and further comprising:

a plurality of light sources each of which being held by a respective one of said at least most of said mounting extensions; and wherein said at least one mounting connection comprises a bolt, a portion of which engages at least one of the plurality of mounting extensions and a portion of said clearance light fixture.

* * * * *

UNITED STATES PATENT AND TRADEMARK OFFICE
CERTIFICATE OF CORRECTION

PATENT NO.　：　5,669,697
DATED　　　　：　September 23, 1997
INVENTOR(S)：　Angelo et al.

It is certified that error appears in the above-identified patent and that said Letters Patent is hereby corrected as shown below:

Column 12, line 13, change "from" to --front--.

Signed and Sealed this

Twenty-fourth Day of February, 1998

Attest:

BRUCE LEHMAN

Attesting Officer　　　　Commissioner of Patents and Trademarks